United States Patent
Okuley et al.

(10) Patent No.: US 6,956,542 B2
(45) Date of Patent: Oct. 18, 2005

(54) METHOD, APPARATUS AND SYSTEM FOR A SECONDARY PERSONAL COMPUTER DISPLAY

(75) Inventors: James Okuley, Portland, OR (US); Britney D. Edwards, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 10/325,512

(22) Filed: Dec. 20, 2002

(65) Prior Publication Data

US 2004/0119660 A1    Jun. 24, 2004

(51) Int. Cl.[7] ............................................. G09G 5/00
(52) U.S. Cl. ...................................... 345/1.1; 345/2.1
(58) Field of Search .................. 345/1.1, 2.1, 540–545, 345/507, 511, 531, 537, 169; 700/17, 200; 725/60, 1

(56) References Cited

U.S. PATENT DOCUMENTS

| | | | |
|---|---|---|---|
| 5,325,287 A * | 6/1994 | Spahr et al. .................. | 700/17 |
| 6,411,302 B1 * | 6/2002 | Chiraz ......................... | 345/545 |
| 6,589,190 B2 * | 7/2003 | Kanderian et al. .......... | 600/587 |
| 2002/0049975 A1 * | 4/2002 | Thomas et al. ............... | 725/60 |
| 2003/0179154 A1 * | 9/2003 | Demsky et al. .............. | 345/1.1 |
| 2004/0003159 A1 * | 1/2004 | Kumar et al. ................ | 710/302 |
| 2004/0010739 A1 * | 1/2004 | Odom et al. ................. | 714/724 |
| 2004/0090424 A1 * | 5/2004 | Hurley et al. ................ | 345/169 |
| 2004/0103333 A1 * | 5/2004 | Martwick et al. ............ | 713/400 |

OTHER PUBLICATIONS

Dave Dzatko et al. PCI Express Primer, Sep. 26, 2002 Mind Sahre Agilent Technologies.*

* cited by examiner

Primary Examiner—Vijay Shankar
Assistant Examiner—Prabodh Dharia
(74) Attorney, Agent, or Firm—Sharmini N. Green

(57) ABSTRACT

An independently functional secondary device may be coupled to a personal computer ("PC") system. In one embodiment, the secondary device may be capable, when coupled to the PC system, of displaying output data from the PC system on the secondary device display. The secondary device may also perform independent processing when decoupled from the PC system.

12 Claims, 6 Drawing Sheets

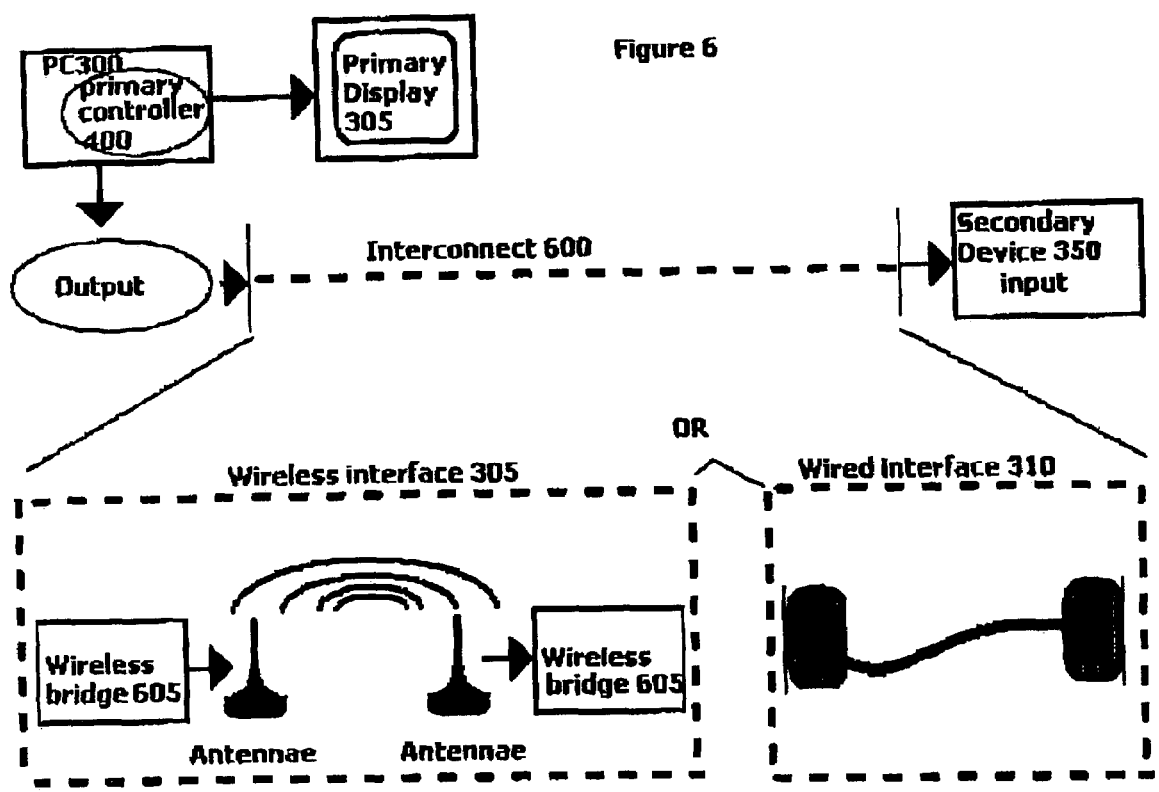

METHOD, APPARATUS AND SYSTEM FOR A SECONDARY PERSONAL COMPUTER DISPLAY

FIELD OF THE INVENTION

The present invention relates to the field of computer displays and, more specifically, to a personal computer having a modular secondary display device that is capable of functioning as an independent processing device.

BACKGROUND

Computer users today may attach a secondary display to their personal computers ("PCs") and configure the behavior of both the primary and secondary displays via the PC operating systems ("OS"). For example, on a PC running one of the Microsoft Windows™ family of operating systems, the secondary display may function in one of two ways. First, the PC may treat the secondary display as a duplicate of the primary display. This scenario often arises when a laptop PC user docks their laptop in a docking station and desires to use a larger display coupled to the docking station. Thus, as illustrated in FIG. 1, when coupled to PC 100, any application (illustrated as "PC Application #1") that appears on Primary Display 105 may also appear on Secondary Display 150.

Alternatively, Secondary Display 150 may be configured to extend the screen real estate of Primary Display 105. In this configuration, Secondary Display 150 behaves as an extension of Primary Display 105. As illustrated in FIG. 1, in this embodiment, Secondary Display 150 may display a different application ("PC Application #2") than the application displayed on Primary Display 105 ("PC Application #1"). This configuration is typically used by sophisticated computer users, such as computer programmers, who require a large amount of screen real estate to view multiple screens and/or applications.

Regardless of the configuration, however, secondary displays are typically non-intelligent devices attached to the main PC system. In other words, these displays do not include any processing capabilities, and if detached from the main PC system, these displays may not be functional for any other purpose.

Personal digital assistants ("PDAs"), on the other hand, are intelligent devices that may be attached or docked to PC systems. PDAs, unlike the secondary displays described above, generally include processing systems independent of the PC systems they may be docked to, i.e., these devices are typically capable of independent processing when undocked. FIG. 2 illustrates PDA 200 coupled to PC 100. As illustrated, while coupled, PDA 200 continues to function as an independent device and displays its own applications ("PDA Application #1") while PC 100 displays a PC application ("PC Application #1"). Although PC 100 and PDA 200 may be capable of synchronizing data between the two devices, the applications for each device are managed independently. In other words, PC 100 may not utilize PDA 200's display area as a secondary display.

BRIEF DESCRIPTION OF THE DRAWINGS

The present invention is illustrated by way of example and not limitation in the figures of the accompanying drawings in which like references indicate similar elements, and in which:

FIG. 6 illustrates a secondary device coupled to a primary machine according to various embodiments.

DETAILED DESCRIPTION

Embodiments of the present invention provide PCs with a modular secondary device. More specifically, according to embodiments of the present invention, a secondary device provides a PC with a secondary display while attached to the PC, and functions as a standalone computing device when unattached to the PC. For the purposes of this specification, reference to "display" shall include computer monitors and/or any other types of display devices capable of being coupled to a PC system. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
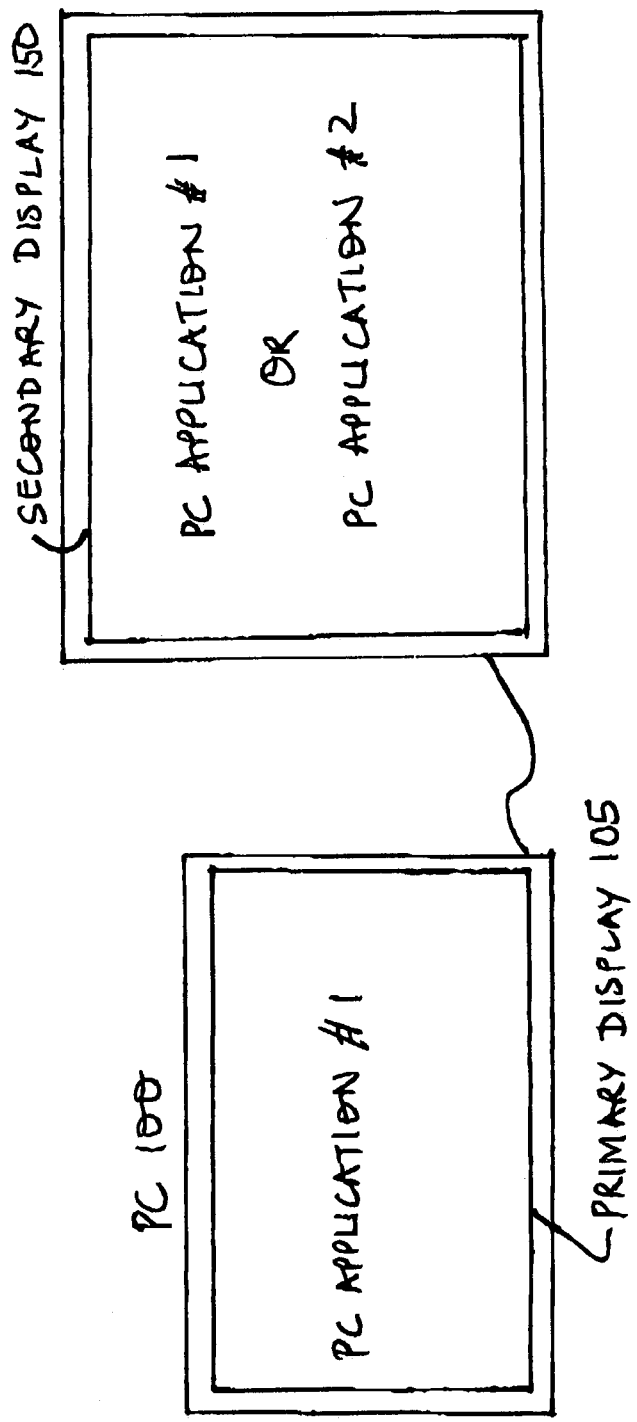
FIG. 1 illustrates a secondary display coupled to a PC system.
Figure 2:
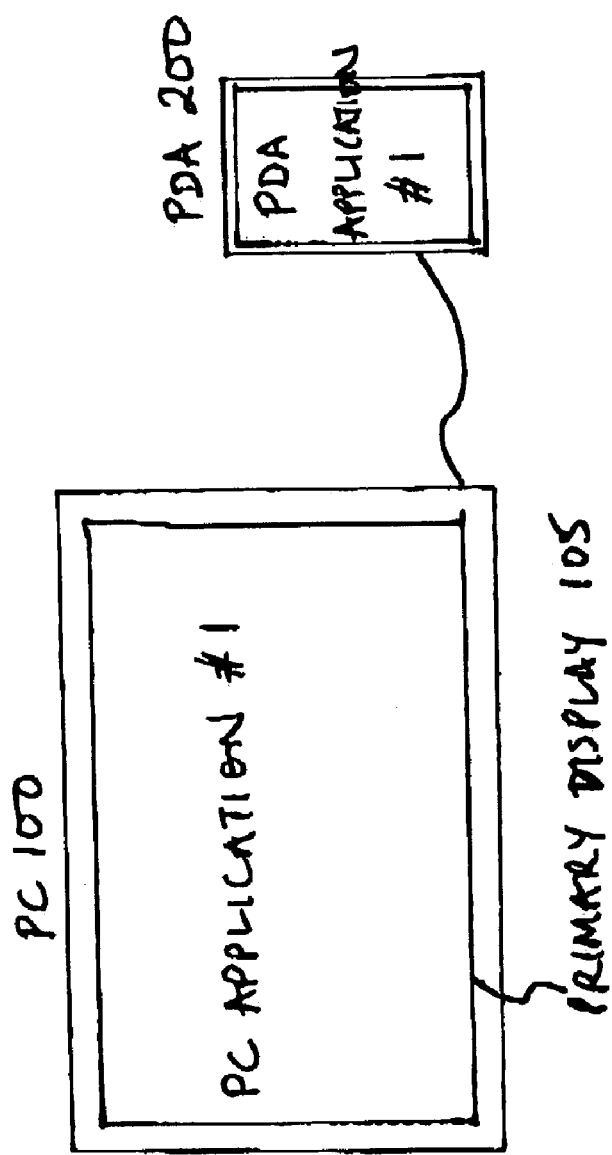
FIG. 2 illustrates a personal digital assistant coupled to a PC system.
Figure 3:
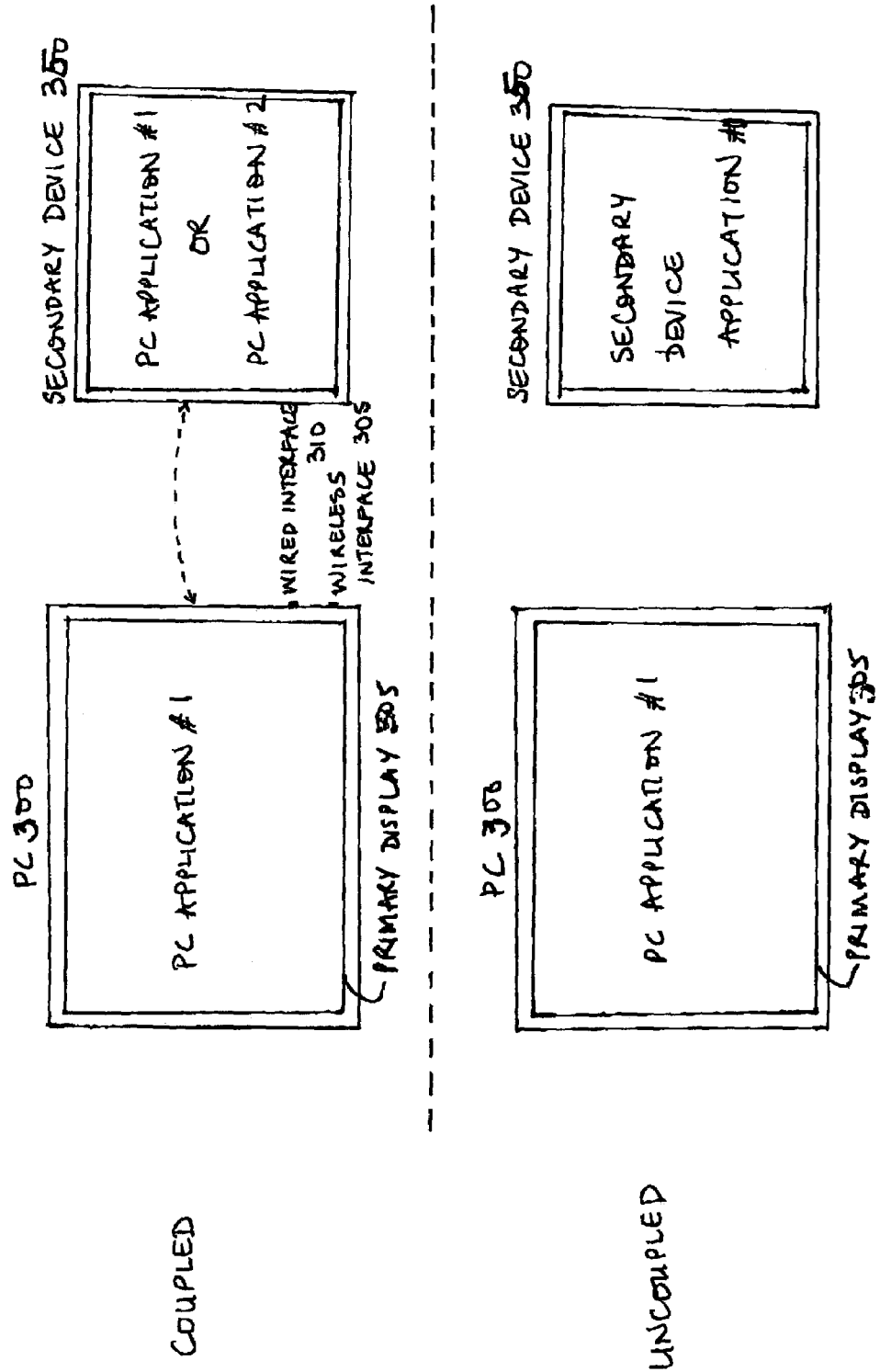
FIG. 3 illustrates a system according to an embodiment of the present invention.

According to one embodiment of the present invention, a secondary device provides a PC with dual display functionality when the device is coupled to the PC. When uncoupled from the PC, on the other hand, the secondary device functions as an independent processing device, capable of standalone processing. FIG. 3 illustrates an embodiment of the present invention. As illustrated, Secondary Device 350 may be coupled to PC 300 having Primary Display 305. While coupled to PC 300, PC 300 may utilize Secondary Device 350's display area to display PC applications. Secondary Device 350 may be coupled to PC 300 via any interconnection technology. For example, in one embodiment, Secondary Device 350 may be coupled or docked to PC 300 via Wireless Interface 305. While coupled to PC 300 via Wireless Interface 305, Secondary Device 350 may provide secondary monitor functionality to PC 300, enabling PC 300 to utilize Secondary Device 350's display area as its own. In an alternate embodiment, Secondary Device 350 may be physically coupled to PC 300 via a Digital Video Interface ("DVI") connection or other wired interface (illustrated collectively as "Wired Interface 310"). In this embodiment, Secondary Device 350 functions as a secondary monitor only while physically coupled to the PC via Wired Interface 310. Wireless Interface 305 and Wired Interface 310 are discussed in further detail below.

Figure 4:
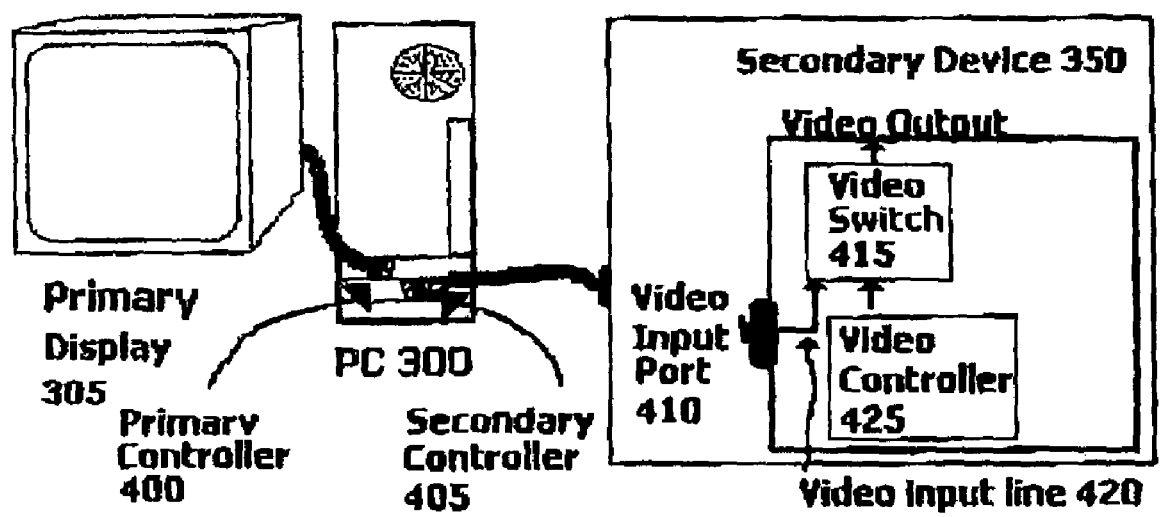
FIG. 4 illustrates one embodiment of the present invention.

According to one embodiment illustrated in FIG. 4, PC 300 may include two video controllers. The first video controller ("Primary Controller 400") may provide routine display capabilities for PC 300 while the second video controller ("Secondary Controller 405") may be coupled to a video input port ("Video Input Port 410") on Secondary Device 350. It will be readily apparent to one of ordinary skill in the art that in one embodiment, both video controllers may exist on a single video card, while in an alternate embodiment, each video controller may reside on a separate video card. In one embodiment, the video input port on Secondary Device 350 may be routed to a video switch ("Video Switch 415") designed to toggle Secondary Device 350's display output between video output from Secondary Device 350 (i.e., from Video Controller 425 coupled to Secondary Device 350) and video input from PC 300.

Video Switch 415 may be designed to toggle automatically or manually. According to one embodiment, Video Switch 415 may automatically feed video output from the video input port on Secondary Device 350 upon sensing data on the input line ("Video Input Line 420"). In an alternate embodiment, the Video Switch 415 may switch between displaying output from Video Controller 425 (coupled to Secondary Device 350) and video input from PC 300 upon receipt of a manual command (e.g., a keyboard command or other such manual input).

Figure 5:
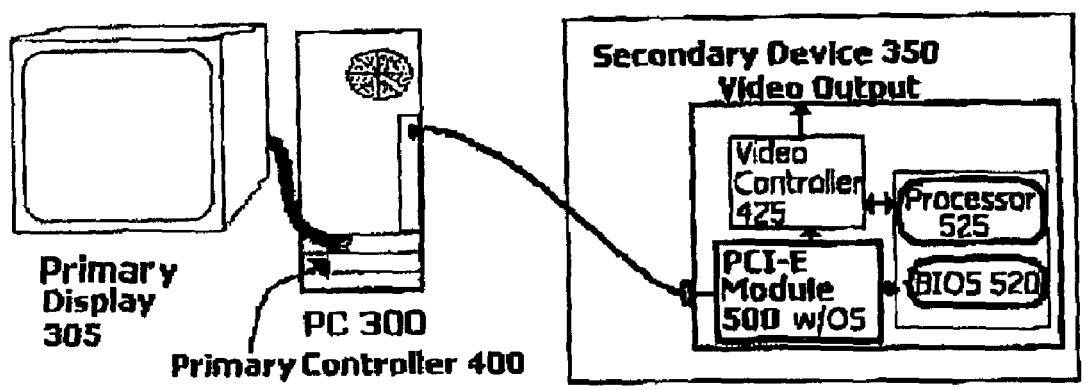
FIG. 5 illustrates an alternate embodiment of the present invention.

According to an alternate embodiment, instead of two video controllers, PC 300 may include only Primary Controller 400, as illustrated in FIG. 5. In this embodiment, Primary Controller 400 may continue to provide PC 300 with graphics capabilities. In order for PC 300 to display applications on Secondary Device 350, however, Secondary Device 350 may be coupled to PC 300 via any interconnection methodology, such as PC Interconnect Express ("PCI-E," Revision 1.0, Jul. 22, 2002). The recently promulgated PCI-E architecture provides point-to-point serial interconnections between devices. According to one embodiment, Secondary Device 350 and PC 300 are coupled using PCI-E Module 500, via an external cable. According to an alternate embodiment, PCI-E Module 500 may be implemented internal to Secondary Device 350 (as illustrated in FIG. 5). It will be readily apparent to those of ordinary skill in the art that PCI-E Module 500 may be implemented externally or internally without departing from the spirit of embodiments of the present invention.

Once the devices are coupled, PCI-E Module 500 may be designed to (automatically or manually) instruct Secondary Device 350 to enter into a suspended or "hibernate" state. As is well known to those of ordinary skill in the art, when transitioning to a hibernate state, Secondary Device 350 may write all system and application state information to its hard drive and then power down. When Secondary Device 350 is rebooted and/or powered back on, the saved system and application information ("Saved Configuration") may be used to automatically restore the device to its configuration immediately prior to entering hibernation.

In one embodiment, after entering hibernation, Secondary Device 350 may reboot itself. Instead of restoring its state from the Saved Configuration, however, according to one embodiment, Secondary Device 350 may reboot into the minimal operating environment stored in PCI-E Module 500 (illustrated in FIG. 5 as "PCI-E Module 500 with OS"). PCI-E Module 500 may be designed to include operating instructions that may enable Secondary Device 350 to boot into a minimal operating environment ("Secondary Operating Environment"). While running the Secondary Operating Environment, Secondary Device 350 may receive and process data from PC 300 utilizing its own processor ("Processor 525") and graphics engine (e.g., on Video Controller 425), and display the processed data output on Secondary Display 350's display area.

According to one embodiment, Secondary Device 350's basic input-output system ("BIOS 520"), which governs the device's boot procedures (amongst other things), may be modified to recognize PCI Express Module 500 during Secondary Device 350's boot sequence. More specifically, BIOS 520 may be modified to recognize PCI-E Module 500 as being higher in priority than Secondary Device 350 during the boot sequence. Thus, when Secondary Device 350 reboots after being coupled to PC 300 via PCI-E Module 500, Secondary Device 350 may boot up Secondary Operating Environment from PCI-E Module 500. Modifications to BIOS 520 may be performed manually (e.g., by a user manually changing BIOS 520's settings via the BIOS vendor's user interface) or automatically (e.g., by the BIOS vendor, in the BIOS code that ships with BIOS 520).

According to one embodiment, when Secondary Device 350 is decoupled from PC 300, Secondary Device 350 may (either automatically or manually) reboot itself. This time, however, when Secondary Device 350 starts up decoupled from PC 300, it may retrieve Saved Configuration from its hard disk and restore the device to its configuration immediately prior to entering hibernation. In this decoupled mode, Secondary Device 350 may function as a standalone processing system.

According to embodiments of the present invention, Secondary Device 350 may be coupled to PC 300 in a number of ways, illustrated as Interconnect 600 in FIG. 6. For example, in one embodiment, Secondary Device 350 may be coupled or docked to PC 300 via Wireless Interface 305, as illustrated in FIG. 6. Wireless Interface 305 may be any wireless interface compliant with various wireless standards such as Bluetooth (Version 1.1, Feb. 22, 2001) or Institute of Electronics and Electrical Engineers ("IEEE") 802.11 (all versions). In one embodiment, Wireless Interface 305 may include a video-to-wireless bridge and in an alternate embodiment, a PCI-E-to-wireless bus may be utilized (both bridges shown collectively in FIG. 6 as "Wireless Bridge 605").

In an alternate embodiment, Secondary Device 350 may be physically coupled to PC 300 via a DVI connection or other wired interface (illustrated collectively as "Wired Interface 310"). In this embodiment, Secondary Device 350 may function as a secondary display only while physically coupled to the PC via Wired Interface 310. Wired Interface 310 may be implemented using any physical connection technology. For example, in an embodiment wherein a PCI Express connection is utilized between PC 300 and Secondary Device 350, an external port cable may be used to link the two devices together.

According to an embodiment of the invention, regardless of the type of connection to PC 300, when uncoupled from PC 300, Secondary Device 350 may function as a standalone computing device. Thus, for example, when Secondary Device 350 is no longer coupled to PC 300 (e.g., if Secondary Device 350 switches from wireless mode to standalone mode), Secondary Device 350 may function as a standalone processing device and display its own applications (illustrated as "Secondary Device Application #1" in FIG. 3). The methods for switching between a wireless mode and standalone mode are well known to those of ordinary skill in the art and further description thereof is omitted herein in order not to unnecessarily obscure the present invention.

In a standalone mode, Secondary Device 350 may be designed to perform a variety of functions. In one embodiment, Secondary Device 350 may be a PDA-type device. Thus, for example, Secondary Device Application #1 (in FIG. 3) may enable users to update their calendars, generate to-do lists, maintain addresses, and other such tasks. Other examples of functionality include wireless access to the PC, digital picture sharing, games, and MP3 music playback. In an alternate embodiment, Secondary Device 350 may be a laptop computer.

It will be apparent to those of ordinary skill in the art that various existing devices may be modified according to embodiments of the present invention to function as Secondary Device 350. For example, existing devices may be physically modified to function as Secondary Device 350 or a PCI Express "converter" may be used with an existing device to store the required programs and convert PCI Express Module 500's port to an external cable port. PCI Express converter functionality may be added to PCI Express Module 500 or be implemented in an independent device (illustrated conceptually in FIG. 5 as "PCI-E Converter 515"). In either circumstance, PCI Express Converter 515 may provide added functionality to Secondary Device 350. Thus, for example, if Secondary Device 350 is an existing PDA, when coupled to PCI Express Converter 515, Secondary Device 350 may include the added functionality of embodiments of the present invention. Specifically, Secondary Device 350 may now identify when it is coupled to PC 300, enter into a hibernate state and reboot itself into a Secondary Operating Environment. Alternatively, Secondary Device 350 may be designed specifically for use according to embodiments of the present invention and may incorporate the functionality of PCI Express Converter 515.

Embodiments of the present invention thus provide PC users with a significant advantage over existing technology. As described above, secondary displays today are essentially non-intelligent devices, capable of serving only as secondary display devices. Alternatively, PDAs and other such personal computing devices are capable of functioning only as independent devices. When coupled to a PC, these devices are generally capable of synchronizing their data with the PC, but the PC may not be able to control the device in any way. According to embodiments of the present invention, however, PC users may enjoy the benefits of both worlds with a single device.

According to one embodiment, the secondary device may include and/or be coupled to at least one machine-accessible medium. As used in this specification, a "machine" includes, but is not limited to, a computer, a network device, a personal digital assistant, and/or any device with one or more processors. A "machine-accessible medium" includes any mechanism that stores and/or transmits information in any form accessible by a machine, the machine-accessible medium including but not limited to, recordable/non-recordable media (such as read only memory (ROM), random access memory (RAM), magnetic disk storage media, optical storage media and flash memory devices), as well as electrical, optical, acoustical or other form of propagated signals (such as carrier waves, infrared signals and digital signals).

According to an embodiment, the secondary device may further include various well-known components such as one or more processors. The processor(s) and machine accessible media may be communicatively coupled using a bridge/memory controller, and the processor may be capable of executing instructions stored in the machine accessible media. The bridge/memory controller may be coupled to a graphics controller, and the graphics controller may control the output of display data on a display device. The bridge/memory controller may be coupled to one or more buses. A host bus host controller such as a Universal Serial Bus ("USB") host controller may be coupled to the bus(es) and a plurality of devices may be coupled to the USB. For example, user input devices such as a keyboard and mouse may be included in the secondary device for providing input data.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A dual display computing system, comprising:
a primary device including a first processor and a primary display; and
a secondary device including a second processor and a secondary display, the secondary device capable, when coupled to the primary device via a PCI Express connector, of displaying a first output data from the primary device on the secondary display, the secondary device further capable, when decoupled from the primary device, of displaying on the secondary display a second output data from the secondary device.

2. The dual display computing system according to claim 1 wherein the primary device further includes a first video controller, and wherein the primary device is capable of displaying output data from the primary device on the primary display.

3. The dual display computing system according to claim 2 wherein the primary device further includes a second video controller, and wherein the secondary device is capable of displaying the first output data from the primary device on the secondary display when the secondary device is coupled to the second video controller.

4. The dual display computing system according to claim 2 wherein the secondary device further includes a video input port coupled to a video switch, the video input port capable of routing data from the primary device to the video switch, the video switch capable of causing the second processor to process the data from the primary device and display results from processing the data on the secondary display.

5. The dual display computing system according to claim 1 wherein the secondary device comprises a personal digital assistant and the PCI Express connector is a PCI Express converter.

6. A secondary device in a dual display computing system, comprising: a secondary processor; a secondary display; and a PCI Express connector capable of coupling the secondary device to a primary device, the primary device including a first processor and a first display; the secondary device capable, when coupled to the primary device, of displaying output from the primary device on the secondary display, the secondary device capable, when decoupled from the primary device, of displaying on the secondary display output from the secondary processor.

7. The secondary device according to claim 6 wherein the PCI Express connector comprises a PCI Express converter.

8. The secondary device according to claim 6 further comprising a video input port coupled to a video switch, the video input port capable of routing data from the primary device to the video switch, the video switch capable of causing the secondary processor to process the data from the primary device and display output from the data on the secondary display.

9. The secondary device according to claim 6 wherein the secondary device is capable of being coupled to a video controller in the primary device, and wherein the secondary device is capable, when coupled to the video controller in the primary device, of displaying output from the primary device on the secondary display.

10. A method for displaying output on a dual display computing system, comprising: displaying output data from a primary device on a secondary display of a secondary device including a secondary processor and a secondary display; when coupled to the primary device via a PCI Express connector, the primary device including a first processor and a first display and displaying output data from the secondary device on the secondary display when the secondary device is decoupled from the primary device.

11. The method according to claim 10 wherein displaying the output from the primary device further comprises receiving data from the primary device and processing the data to display the results.

12. The method according to claim 10 wherein displaying the output from the primary device further comprises receiving and displaying the output data from the primary device.

* * * * *